United States Patent

[11] 3,603,282

| [72] | Inventor | Andre T. Abromaitis Morristown, N.J. |
|---|---|---|
| [21] | Appl. No. | 5,834 |
| [22] | Filed | Jan. 26, 1970 |
| [45] | Patented | Sept. 7, 1971 |
| [73] | Assignee | McGraw-Edison Company Elgin, Ill. |

[54] POINTER-DIAL ARRANGEMENT FOR DUAL PRESSURE GAUGE
5 Claims, 6 Drawing Figs.

[52] U.S. Cl. .................................. 116/129,
73/386, 116/70
[51] Int. Cl. .................................. G09f 9/00
[50] Field of Search .......................... 116/124,
70, 129, 129 T, 133; 33/204; 73/386; 58/43, 50, 127

[56] References Cited
UNITED STATES PATENTS

| 2,502,985 | 4/1950 | Paulson ........................ | 58/50 |
| 2,627,245 | 2/1953 | Kimball ........................ | 116/129 T |
| 2,662,368 | 12/1953 | Glenn ........................... | 116/129 X |
| 2,874,671 | 2/1959 | Blackwell et al. ............. | 116/129 |
| 3,033,155 | 5/1962 | Beckman ....................... | 116/129 |
| 3,262,416 | 7/1966 | Nichinson ..................... | 116/129 |

FOREIGN PATENTS

| 471,217 | 1/1951 | Canada ......................... | 116/129 |

Primary Examiner—Louis J. Capozi
Attorney—George H. Fritzinger

ABSTRACT: A dual pressure gauge has an arcuate dial in a plane at right angles to the pointer axis, and has also a disk-shaped dial within the outer arcuate dial and flush therewith. The center dial has a pointer mark registering with the outer dial to measure one pressure. A dual pointer at the center of the two dials has one pointer hand registering with the outer dial to measure a second pressure and has a second pointer hand displaced from the first by 120° and registering with graduations on the center dial to measure the difference between the two pressures. The dials and dual pointer are made of transparent material and are coated with an opaque material except for the indicia, and a backlighting system is provided to illuminate the indicia.

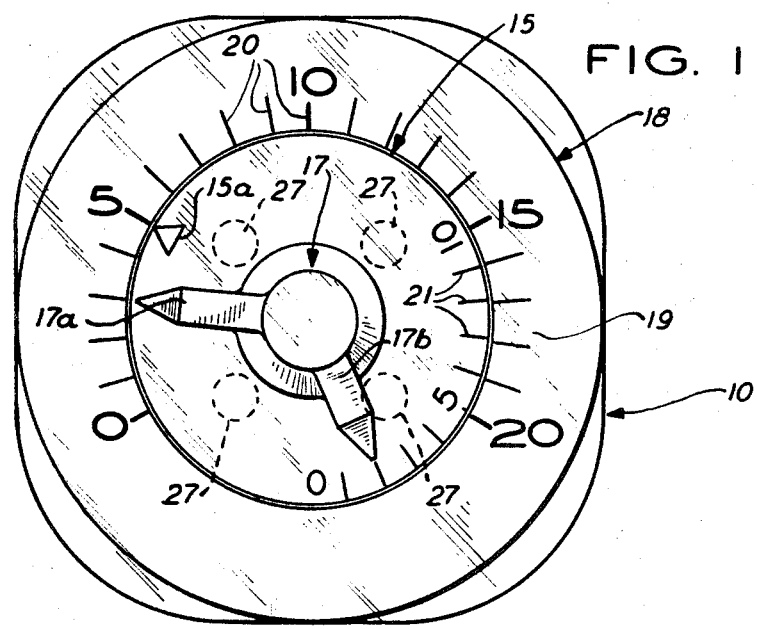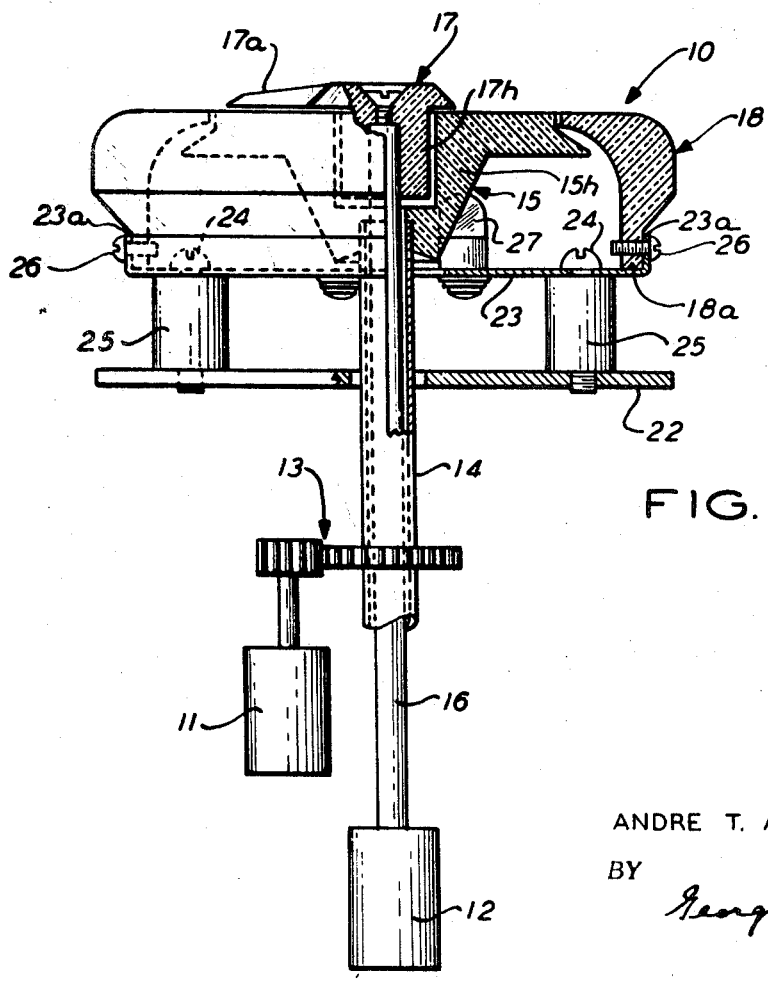

PATENTED SEP 7 1971 3,603,282

INVENTOR.
ANDRE T. ABROMAITIS

BY George H. Fritzinger

AGENT

POINTER-DIAL ARRANGEMENT FOR DUAL PRESSURE GAUGE

An object of the invention is to provide a novel dial and pointer arrangement for measuring a variable quantity wherein the pointer is flush with an arcuate dial in a plane at right angles to the pointer axis to eliminate parallax in reading the dial.

Another object is to provide such novel dial arrangement wherein the pointer is a disk member in the central opening of the arcuate dial having an outer face flush with the dial and provided with a pointer mark registering with the graduations of the outer dial.

Another object is to provide such novel dial arrangement which is provided also with a pointer journaled at the axis of the dials having a hand for measuring a second quantity relative to the outer dial.

Another object is to provide the central disk-shaped dial with graduation marks and to provide the pointer with a second hand registering with the center dial for indicating the difference between the two quantities.

Another object is to make the dials and pointer of transparent plastic material coated at the front with an opaque material except for the indicia and to provide a backlighting system which illuminates the indicia.

These and other objects and features of the invention will be apparent from the following description and the appended claims.

In the description of my invention reference is had to the accompanying drawings, of which:

FIG. 1 is a front view of the dial-pointer system of the present instrument;

FIG. 2 is a side view of the dial-pointer system and driving servos with parts in section on a diameter line of the instrument;

Figure 3:
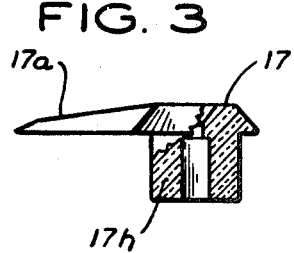
FIG. 3 is a side view partly in section of the dual pointer.
Figure 4:
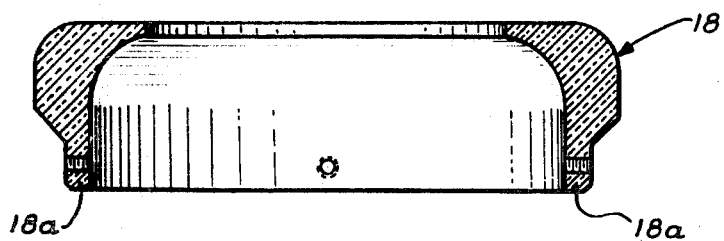
FIG. 4 is a cross-sectional view of the outer dial member.
Figure 5:
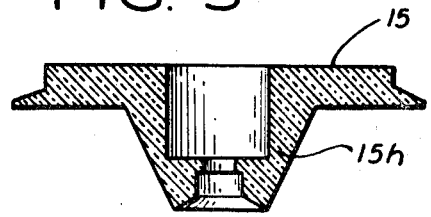
FIG. 5 is a cross-sectional view of the central disk-shaped dial.
Figure 6:
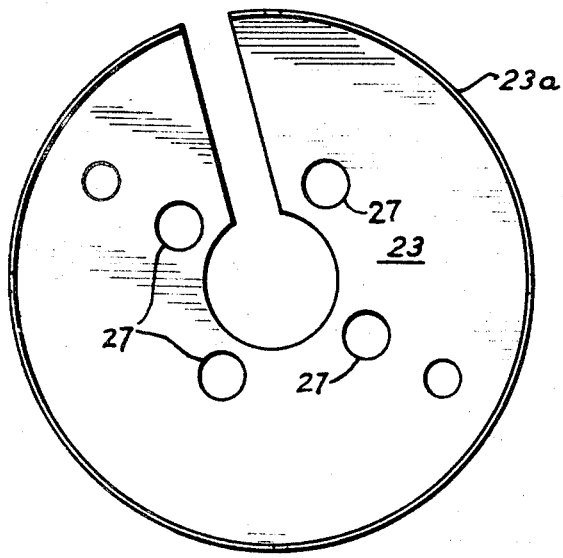
FIG. 6 is a plan view of the lamp deck for the instrument.

The present instrument is by way of illustration a dual pressure gauge 10 having one servomotor 11 actuated according to one pressure to be measured (FIG. 2) and a second servomotor 12 actuated according to a second pressure to be measured. The first servomotor 11 is coupled by gearing 13 to a sleeve shaft 14 which carries a disk-shaped pointer-dial 15 at its outer end. The servomotor 12 is coupled to a shaft 16 which extends through the sleeve shaft 14 and which carries a dual pointer 17 at its outer end. Surrounding the disk-shaped dial 15 is a globe-shaped dial member 18 having a top planar dial face 19 of arcuate shape at right angles to the pointer axis. This dial face has radial graduation marks 20 thereon. A triangular pointer mark 15a provided on the disk-shaped dial 15 registers with the graduations 20 to measure a first pressure according to the actuation of the first servomotor 11. A feature of the dial pointer 15 and of the surrounding arcuate dial 19 is that the outer dial and indicator faces are in a common plane so that no parallax is encountered in reading the first pressure indication. A longer hand 17a of the dual pointer 17 registers also with the graduations 20 on the outer dial member 18 to measure a second pressure according to the actuation of the second servomotor 12.

On the disk-shaped dial-pointer 15 are radially directed graduation marks 21 with which a second pointer hand 17b of the dual pointer 17 registers. The second hand 17b is for example at 120° from the first hand 17a and is shorter than the first hand so that it does not also register with the outer dial member 18. This second hand 17b reads relative to the graduations 21 the difference between the first and second pressures being measured. For example, the outer dial graduations 20 may run from 0 to 20 as indicated in FIG. 1, and the graduations 21 on the inner dial 15 may run from 0 to 10. As is shown in FIG. 1, when the first pressure measurement is at 5 and the second pressure measurement is at 3, the shorter hand 17b reads at 2 to indicate the difference between the first and second pressures.

The instrument has a supporting base 22 on which a lamp deck 23 is secured by screws 24 through spacing collars 25. The lamp deck has an upturned rim flange 23a which embraces a depending flange 18a of the outer dial member 18. Screws 26 extend through clearance holes in the flange 23a and thread into the flange 18a to secure the dial member 18 to the lamp deck.

The dial members 15 and 18 and the pointer 17 are all made of a translucent plastic capable of passing light therethrough. The exposed outer surfaces of these dial members and pointer are covered with a black opaque material except for the indicia thereon, the term "indicia" being herein used to means also the indicating tips of the two pointer hands 17a and 17b. Mounted on the lamp deck are four equally spaced light bulbs 27. The light emitted from these bulbs passes through the clear undersurfaces of the dial members and pointer to illuminate the indicia of these members. In order that the pointer 17 may pick up a greater amount of light from the light bulbs 27 it is provided with a depending cylindrical hub 17h and, for the same reason, the dial-pointer 15 is provided with a depending cone-shaped hub 15h which surrounds the hub 17h at a clearance distance therefrom. Thus, a compact instrument which can be read easily and accurately is provided for measuring dual pressures as well as the differential between the two pressures.

The instrument herein described is intended to be illustrative and not necessarily limitative of any invention since the same is subject to changes and modifications without departure from the scope of my invention which I endeavor to express according to the following claims.

I claim:

1. A measuring instrument comprising an arcuate dial member having a planar face at right angles to the axis of the dial member with radially directed graduation marks thereon, an inner dial of a disk shape within said dial member and flush therewith, said inner dial having a pointer mark registering with the graduations on said dial member, said dial member and inner dial being made of light-conducting material, including a common light source back of said inner dial and dial member, said inner dial and dial member having a black opaque coating on the outer exposed surfaces thereof except for the indicia thereon whereby said light source will illuminate said indicia.

2. The instrument set forth in claim 1 wherein said inner dial has a depending hub, and wherein said outer dial member has a globular shape surrounding said light bulbs whereby said inner dial and dial member pick up a greater amount of light from said light source to better illuminate said indicia.

3. An indicator instrument comprising an outer arcuate dial member having a graduated dial face in a plane at right angles to its axis, a disk-shaped dial-pointer member in said dial member flush with said dial face and provided with graduation marks along a portion of its rim and with a pointer mark on another portion, said pointer mark registering with said graduated dial face, means for actuating said dial-pointer member to cause said pointer mark to indicate one variable quantity relative to said graduated dial face, a pointer pivoted at said axis and having one hand registering with said graduated dial face, means for actuating said pointer to indicate a second variable quantity relative to said graduated dial face, said pointer having a second shorter hand registering with the graduation marks on said disk-shaped dial-pointer member and said graduation marks being positioned on said dial-pointer member whereby said second pointer hand indicates the differential between said quantities.

4. The indicator instrument set forth in claim 3 wherein said dial member, dial-pointer member and said pointer are made of light-conducting translucent plastics and are coated on their outer exposed surfaces with a black opaque material except for the indicia thereon, including a light source at the back sides of said dial members and pointer for illuminating said indicia.

5. The indicator instrument set forth in claim 4 wherein said arcuate dial member has a globe shape with a depending rim flange, said disk-shaped dial-pointer member has a depending hub with a central opening and said pointer has a depending hub in said central opening at a clearance spacing from said dial-pointer member, and wherein said light source includes a plurality of light bulbs disposed between said rim flange of said outer dial member and the hub of said dial-pointer member.